United States Patent [19]

Normandin

[11] Patent Number: 4,867,515
[45] Date of Patent: Sep. 19, 1989

[54] ALL-OPTICAL MODULATOR WITH A CHANNEL WAVEGUIDE

[75] Inventor: Richard J. F. Normandin, Ottawa, Canada

[73] Assignee: Canadian Patents and Development Ltd., Ottawa, Canada

[21] Appl. No.: 228,473

[22] Filed: Aug. 5, 1988

[51] Int. Cl.[4] ............................................. G02B 6/10
[52] U.S. Cl. .................................................. 350/96.13
[58] Field of Search ................ 350/96.13, 96.14, 96.15

[56] References Cited

U.S. PATENT DOCUMENTS 4,693,547  9/1987  Soref et al. ..................... 350/96.13

OTHER PUBLICATIONS

14th Congress of the ICO, "Optics and the Information Age", 1987, pp. 529–532, R. Normandin & D. C. Houghton & M. Simard-Normandin.
Topical Meeting on Integrated and Guided-wave Optics, 1988, Technical Digest Series, vol. 5, pp. 351–354, 1988, Normandin et al.
IEEE Journal of Quantum Electronics, vol. QE-22, No. 6, pp. 873–879, R. A. Soref et al, Jun. 1986.
"Solid State and Semiconductor Physics", J. P. McKelvey, Harper & Row, Publishers, pp. 333–342.

Primary Examiner—James W. Davie
Attorney, Agent, or Firm—Yoshiharu Toyooka

[57] ABSTRACT

All optical modulators are disclosed which include a channel waveguide made of an optically nonlinear material and transmitting an infrared beam. A control light whose wavelength is shorter than the bandgap energy of the channel of the guide is directed to the guide to bring it to cutoff. Near 100% modulation was obtained for a silicon waveguide with less than 150 pJ with a subnanosecond initiation and recovery time in a three port, fiber optics, geometry suitable for use as a logic gate. The operation is largely wavelength independent and stable.

14 Claims, 5 Drawing Sheets

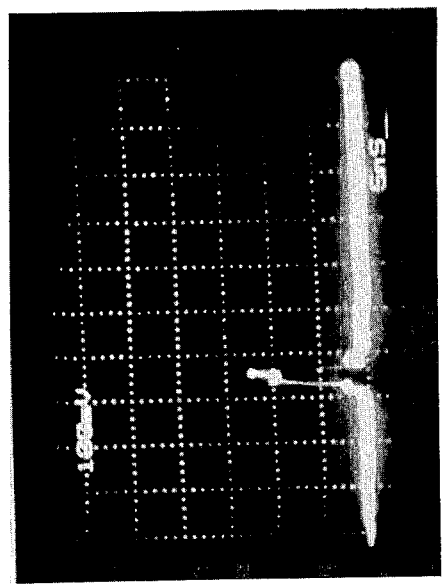
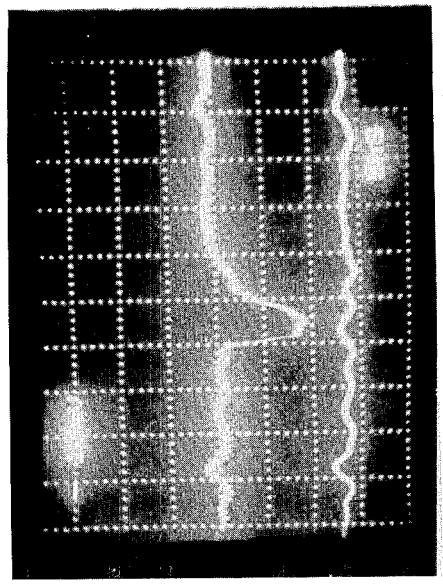
FIG. 4a  FIG. 4b
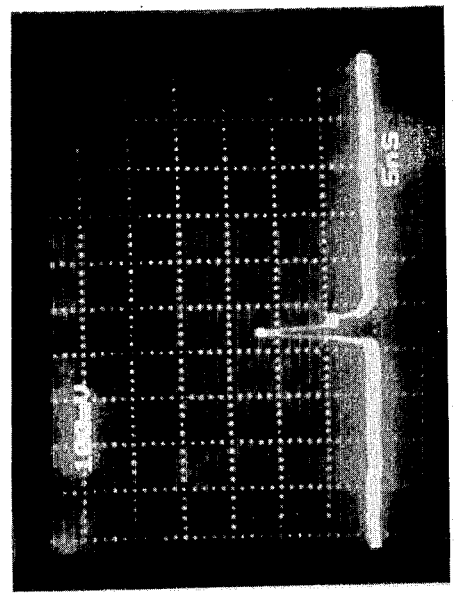
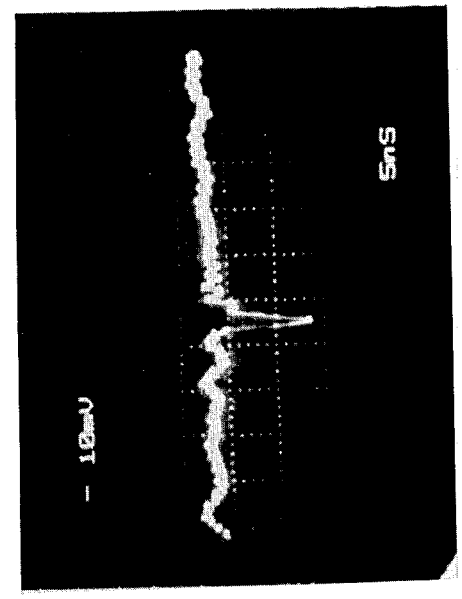
FIG. 5a  FIG. 5b

ALL-OPTICAL MODULATOR WITH A CHANNEL WAVEGUIDE

FIELD OF THE INVENTION

The present invention relates to fiber optic modulators and in particular to all-optical integrated fiber optic modulators which include a channel waveguide.

BACKGROUND OF THE INVENTION

Advances in optically nonlinear materials and single mode fiber technology have led to a renewed interest in integrated optics. For coherent communication fiber systems, integrated optics offers the possibility of an entirely monolithic implementation of narrow linewidth lasers, modulators, detectors, frequency shifters and optical switches. With III-V semiconductors optical functions and associated electronics for drivers and detectors can be on the same opto-electronic chip. Recent advances in nonlinear integrated optics also hold promises for applications in all-optical processing and interfacing of fiber signals. Power dependent nonlinear couplers, nonlinear distributed feedback gratings, optically tunable filters, bistable integrated gratings and logic gates are all possible applications of integrated optics in communication systems resulting from a better understanding of nonlinear guided mode behaviour. New organic (such as liquid crystals) o semiconductor materials (e.g. MQW: multiple quantum wells) in an integrated optics context may provide the properties needed to make all-optical processing viable in the next generation devices.

Several nonlinear switches using bistable devices, some to be used as logic gates, have been demonstrated in the past. Their use for the elimination of conversions between electrical and optical signals in fiber optic communications systems is of great interest and is driving research in novel nonlinear materials. To date, most of the devices demonstrated are based on highly engineering materials and are, unfortunately, also wavelength and temperature sensitive. Silicon has been popular in the past as a substrate for other types of optical waveguides but was largely neglected as the guiding medium itself, apart from some early work at 10.6 $\mu$m. Soref and Lorenzo (J. of Quantum Electronics QE-22, p. 873, 1986) recently demonstrated multimode silicon waveguides for use in the near infrared at wavelengths of use in long distance fiber optics and although they mentioned the possibility of optically controlling the waveguide properties, they have concentrated on the electrooptical aspects. They also pointed out several advantages in using silicon for integrated optics. In the present inventor's copending U.S. patent application No. 07/079,767 filed July 30, 1987 now U.S. Pat. No. 4,776,658 issued on Oct. 11, 1988, fiber optic modulators are disclosed in which an optically nonlinear material, e.g. silicon, is provided between a pair of single mode fiber optics defining a fiber-to-fiber mode coupling having a predetermined coupling factor. A control light from a control fiber optic modifies the coupling factor of the nonlinear material, thus modulating the transmission of the carrier light. However, the non-linear material used therein does not form a waveguide. Furthermore, the operating principles are entirely different from those described here.

OBJECTS OF THE INVENTION

It is therefore an object of the present invention to provide all optical modulators which include channel waveguides.

It is another object of the present invention to provide an optic modulator in which the guiding cutoff conditions are disturbed by a control light thus modulating the transmission of light.

It is still another object of the present invention to provide an optic modulator in which the channel waveguide is formed by doping appropriately with dopants.

SUMMARY OF THE INVENTION

Briefly stated, an optical modulator according to the present invention comprises a channel waveguide which have a substrate and a channel provided on the said substrate. The channel has the refractive index higher than that of the substrate and is provided with two ends for transmitting therethrough under a guiding condition a light having the wavelength longer than the bandgap energy of the said channel. An input fiber optic is optically coupled to one of the two ends of the channel for sending the light into it, and an output fiber optic is also optically coupled to the other of the two ends for receiving the light therefrom. A control fiber optic is optically coupled to the channel between the two ends for sending a control light having the wavelength shorter than the bandgap energy of the channel so that the control light lowers the effective refractive index of the channel to a cutoff level to disturb the guiding condition.

BRIEF DESCRIPTION OF THE DRAWINGS

For a more complete understanding of the present invention and for further objects and advantages thereof, references may now be made to the following description taken in conjunction with the accompanying drawings in which:

FIGS. 4a, 4b; 5a, 5b; 6a and 6b are photographs showing control lights and responses of the modulators of the present invention.

DETAILED DESCRIPTION OF THE PREFERRED EMBODIMENTS

Figure 1:
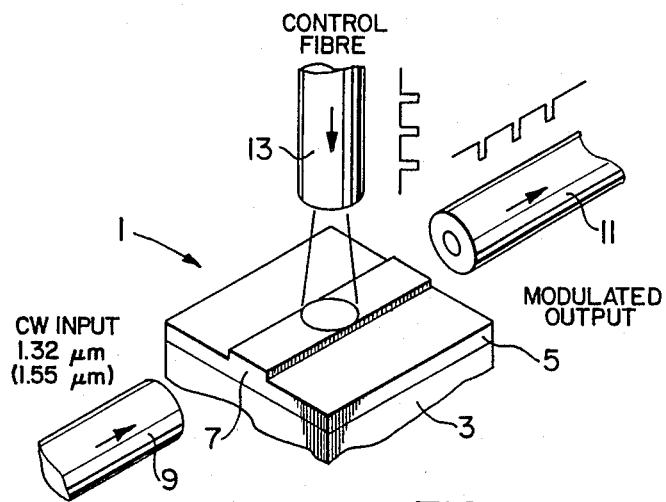
FIG. 1 is a schematic illustration of an all-optical modulator according to one embodiment of the invention.

FIG. 1 is a schematic illustration of an all optical modulator according to an embodiment of the present invention. A channel waveguide 1 is made of silicon substrate 3 and a channel layer 5, a part of which has the thickness larger than the remaining part and forms a channel 7. It is of course possible to provide a channel on the substrate without the channel layer. An input fiber optic 9 is a single mode fiber carrying an input light of infrared wavelengths, e.g. 1.32 μm, 1.55 μm, etc. An output fiber optic 11 is also a single mode fiber carrying the modulated output light. A modulation fiber optic 13 is a fiber carrying a modulation light of shorter wavelength than the bandgap energy of the material of the channel. The modulation light is directed in this embodiment perpendicularly to the channel between the two ends thereof. In the embodiment a single mode slab waveguide was first made; an antimony doped silicon wafer (carrier density, n-type, $N_2 = 3 \times 10^{18} cm^{-3}$) was used as substrate on which was provided a standard MBE growth of 6.8 μm lightly doped (carrier density $N_1 = 10^{15} cm^{-3}$) epitaxial layer for the layer 5. The wafer was then cleaved to obtain sharp 90° facets suitable for edge coupling of the fibers. The channel 7 was formed by etching parts of the channel layer.

The channel waveguide confines light coupled from the input single mode fiber optic at 1.32 or 1.55 μm in the lightly doped silicon channel. The control fiber optic carries the modulation pulses (of shorter wavelength than the bandgap energy of the channel) which create electron-hole pairs and thus lower the effective index of the channel waveguide to such an extent as to reach the cutoff condition and eliminate transmission through the system.

Since the modulator needs to be only a few hundreds micrometers in total length the intrinsic guide losses are unimportant. One of the major losses being due to Fresnel losses at the interfaces, antireflection coatings on the input and output faces minimize these to 3-4 dB loss. The mode mismatch between the fiber and asymmetric guide also contributes to the insertion loss but without much optimization, the total insertion losses were ranging from 5 to 15 dB depending on coatings and channel quality. Up to 100 mW at 1.32 μm was coupled to the waveguides without any thermal problems for propagation lengths of about 1 mm.

In the experimental setups, a semiconductor laser supplied 0.5 mW of CW 1.55 μm light or, alternatively, a CW Nd-YAG laser generated light at 1.32 μm for the input fiber optic 9 to the waveguide 1. The light was coupled to the single mode fibers with commercial high precision couplers in order to achieve well characterized and reproducible coupling efficiencies. Light pulses for the modulation fiber optic were generated by a gaussian-gaussian (temporal and spatial profile) characteristics at 1.06 μm and 0.53 μm. A dye laser was used to generate 0.80 μm and doubled for the 0.4 μm measurements. The fibers used were of standard step-index design with an 8 μm core, a numerical aperture of 0.12 and single mode at 1.32 μm.

Theoretical treatments of the present invention are now given below.

The absorption of the modulation light in the waveguide creates electron-hole pairs via indirect interband absorption and effectively lowers the waveguide's index of refraction at the guided light wavelength. This effect is used to bring the waveguide to cutoff or used to change the phase of the guided light.

Figure 2:
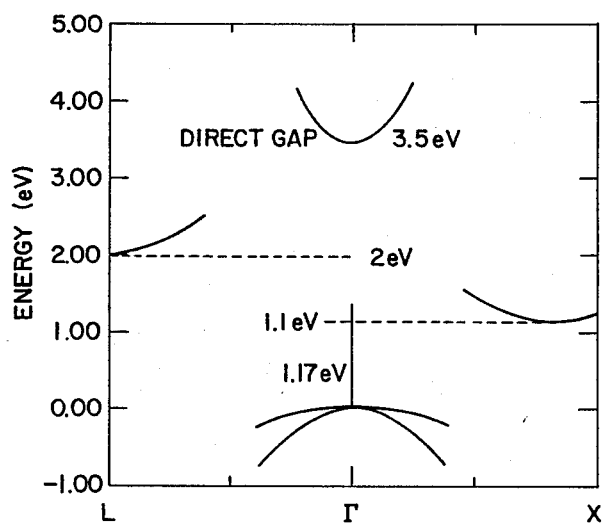
FIG. 2 is a chart showing silicon band structure.

Although the following calculation is given for silicon the same idea can be demonstrated for liquid crystals, GaAs, MQW's, InSb and many other nonlinear materials. Full mode calculations with overlap integral approach were performed but the basic idea is better understood with the simple cutoff derivation that will be explained below. The difference in estimated energies is not significant. The creation of electron-hole pairs by light or the presence of free carriers due to impurities or intentional doping results in a modification of the refractive index in semiconductors. The exact dynamics of these free carriers are dependent on the particular materials and thus the approximations used here will only apply to the case of silicon at room temperature for low to moderate light intensities and doping levels. Because of its indirect bandgap, as outlined in FIG. 2, silicon is relatively transparent even for light close to the bandgap energy (linear absorption coefficient $\alpha = 10$ cm$^{-1}$ at wavelength $\lambda = 1.06$ μm for low intensities). For longer wavelengths the losses are even lower ($\alpha = 10^{-3}$ cm$^{-1}$ at $\lambda = 1.32$ μm). Thus silicon is a suitable low loss material for us in waveguiding geometries at wavelengths over one micrometer. In FIG. 2 it is shown that for a wavelength shorter than approximately 1 μm light will be absorbed resulting in the creation of electron-hole pairs. Other materials, such as GaAs, have different band diagrams and although the numbers are different, the creation of electron-hole pairs or excitons (for MQW) or molecular reorientation (liquid crystals) all result in a net reduction of index of refraction to bring a waveguide made of these materials to cut-off conditions.

The change in index of refraction for the guided light due to electron-hole creation in the waveguide may be estimated (for absorption depth longer or comparable to the guide thickness) as $$\Delta n_g = - \frac{e^2 \sqrt{\pi}}{8\epsilon_0 h \pi^2 c^3} \cdot \frac{\tau}{m_{eh}} \cdot \frac{\alpha_m \lambda_g^2 \lambda_m}{n_g} \cdot I_o$$

for a gaussian pulse in time given by $$I = I_o \exp\left(-\left(\frac{t}{\tau}\right)^2\right)$$

where the subscript m refers to the modulation light, above bandgap energy, and the subscript g to the guided light, and further $I_o$ is the peak intensity, $\tau$ the gaussian time duration, $\alpha_m$ the linear absorption coefficient, c the speed of light in vacuum, $m_{eh}$ the effective mass of an electron-hole plasma, $n_g$ the refractive index for the guided light, $\lambda_g$ and $\lambda_m$ the wavelength in vacuum of the guided and modulation light respectively, e the electronic charge, $\epsilon_o$ the free space permitivity, and h Planck's constant.

The change in index due to the substrate doping at the guided wavelength is given by $$\Delta n_g = (N_2 - N_1) \frac{e^2 \lambda_g^2}{8\pi^2 c^2 n_g \epsilon_o m_e}$$

where $m_e$ is the effective mass of the dopant carrier, $N_1$ and $N_2$ are the carrier densities in the channel (channel layer) and the substrate respectively. Thus if the two previous equations are set equal, the required intensity to bring the waveguide to cutoff can be estimated.

$$I_o = (N_2 - N_1) \frac{h \, c \, m_{eh}}{\sqrt{\pi} \, \tau \alpha_m \lambda_m m_e}$$

Taking the cutoff condition for minimum guide effective thickness into account, $$\Delta n_c = \frac{\lambda_g^2}{32 n_g t_g^2}$$

modifies the previous calculation slightly, $$I_o = \frac{\epsilon_o h \pi^2 c^2 m_{eh}}{e^2 \sqrt{\pi \tau} \alpha_m \lambda_m} \left( \frac{e^2(N_2 - N_1)}{\pi^2 c^2 \epsilon_o^2 m_e} - \frac{1}{4 t_g^2} \right)$$

where $t_g$ is the guide effective thickness.

Figure 3:
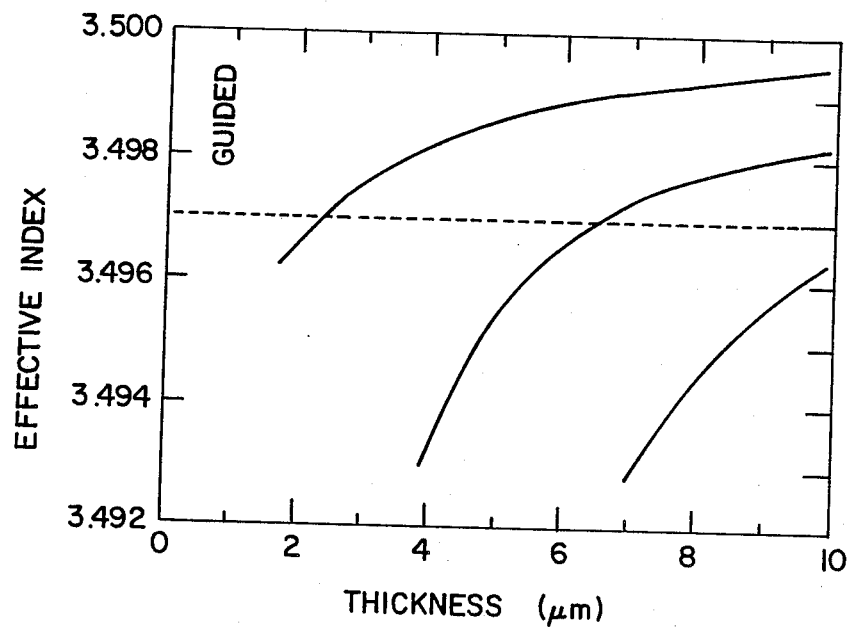
FIG. 3 is a graph showing effective mode index relative to guide thickness for the case of the silicon example.

FIG. 3 shows the effective mode index relative to guide thickness at 1.32 μm and with a substrate doping of $3 \times 10^{18}$ cm$^{-3}$ (n-type) for silicon. The guided modes are in the top portion only above the dotted line. While n-type dopants such as P, As and Sb were mainly considered, p-type dopants, e.g. B, can also be used.

A comparison between this simple theory and the experimental measurements shows a fairly accurate agreement except for 0.4 μm modulation light as will be discussed later.

For short wavelength modulation the absorption length can be much shorter than the waveguide thickness. At $\lambda_m = 0.4$ μm, for example, the linear absorption coefficient is about $3 \times 10^4$ cm$^{-1}$ resulting in a penetration depth of less than 300 nm. Therefore carrier diffusion dynamics in the guide region is the dominant mechanism in creating a time dependent index of refraction profile resulting in an index gradient inside the otherwise uniform guide. The waveguiding properties were analyzed using a WKB approach and the index profile computed for each "time frame" as the plume of electronhole pairs diffused in the guide. The diffusion model was derived from a 2D carrier profile following McKelvey in "Solid State and Semiconductor Physics" Harper and Row, p. 341, (1966).

$$N(x,t) = \frac{\alpha_m \lambda_m e^{-\alpha_m x} I_o}{2hc} \int_{-\infty}^{t} \exp\left\{ D\gamma \alpha_m^2 - \left(\frac{t'}{\tau}\right)^2 \right\} \text{erfc}\left( \frac{2D\gamma \alpha_m - x}{2\sqrt{D\gamma}} \right) dt'$$

where D is the ambipolar diffusion coefficient, and erfc is the complementary error function, and $\gamma = (t - t')$. As will be discussed later good agreement with experimental values was obtained using this model without any adjustable parameters for all cases and 0.4 μm modulation energies in particular.

By employing equations, it is possible to choose an appropriate doping level to maintain close coupling with a given fiber core diameter. This is done by varying the substrate doping to obtain single mode operation at a given waveguide thickness. This point was not appreciated in previous works. The dispersion relation for the asymmetric guide was then solved using the usual techniques and the results for the effective TE mode propagation index are shown in FIG. 3. Single mode operation was achieved for thicknesses ranging from 4 to 7 μm with a n-type substrate doped to $3 \times 10^{18}$ cm$^{-3}$. This is very close to core diameter of 8 μm of the 1.32 μm single mode fibers used in the present embodiment.

Figure 6A:
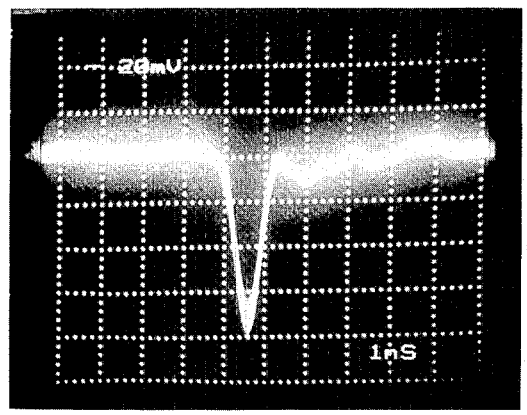
Figure 6B:
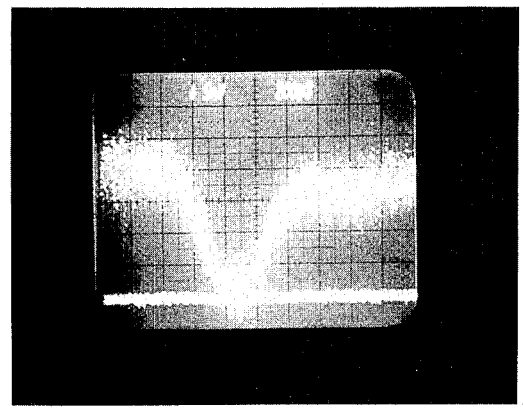

In actual experiments, a typical modular response at 1.32 μm is shown in FIG. 4b with a control pulse of 150 pJ of energy at 0.4 m on the modulation fiber optic which is presented in FIG. 4a. As expected, the initiation time follows the control pulse and the recovery time is consistent with ambipolar diffusion of the electron-hole pairs out of the 6.8 μm guide. The first one was increased by diffusing in 5 nm of gold deposited on the back surface of the wafer at 1000° C. for 10 min. A hydrofluoric acid dip was then used to remove any oxide on the surfaces. Since gold is a very efficient recombination center, the carrier lifetime can be reduced from microseconds to a few hundred of picoseconds. This was then verified as shown in FIG. 5a for 150 pJ of 0.4 μm control light and near 100% modulation depth as evidenced in the response shown in FIG. 5b. Rise and fall times now followed the input laser pulse accurately. Using 80 ps light pulses at 0.53 μm from a CW mode locked Nd-YAG laser with a repetition rate of 76 MHz yielded the results presented in FIGS. 6a and 6b. The rise and fall times are limited in the measurement of FIG. 6a showing a control pulse of 500 MHz bandwidth of a R7912 transient digitizer used in the experiment. In an attempt to rectify the problem, a homemade InGaAs photodiode was modified to achieve speeds in the 300 ps range. The results, using a sampling oscilloscope, are displayed in FIG. 6b showing modular response for 100% modulation with 370 pJ driving energy. The modulation wavelength was systematically changed and the energy required measured: at 1.06 μm, 10 nJ was predicted and 17 nJ was measured; similarly at 0.80 μm it was 311 pJ (predicted) and 360 nJ (measured); at 0.53 μm, it was 327 vs 350 pJ; and finally, at 0.40 μm, 10 pJ was predicted by the simple model and 150 pJ was measured. The 2D diffusion driven model, however, gave 110 pJ which compares well with the measured 150 pJ at 0.4 μm.

Figure 7:
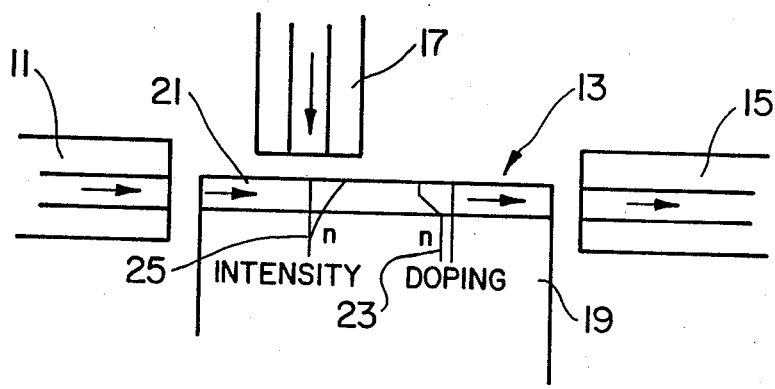
FIG. 7 is a schematic and partly graphic illustration of an optic modulator according to another embodiment of the present invention, using a graded doping profile.

Referring to FIG. 7, another embodiment to speed up the response of the invention is illustrated. In the Figure, an input fiber optic 11 sends a light of wavelength $\lambda = 1.32$ μm into a channel waveguide 13 and an output optic 15 receives the modulated light. A modulation fiber optic 17 is located perpendicularly to the waveguide 13 and sends a control light into it. The waveguide 13 includes a silicon substrate 19 doped with P to $N_2 \sim 10^{18}$ cm$^{-3}$ on which a channel 21 is grown by LPE to a thickness of 6 μm. Within the 6 μm, the first 4 μm from the substrate is graded in carrier density by doping from $N_1 = 10^{18}$ (at the substrate interface) to $N_1 = 10^{15}$. This doping distribution results in an index profile shown graphically at 23 in the Figure. The intensity distribution of the control light in the channel is also shown graphically at 25. This complementary profile enhances faster responses to the control light since all the guide profiles reach cutoff simultaneously. The recovery time is also improved and experimental results identical to FIGS. 6a and 6b were achieved without the need of Au doping. Computer calculation of the waveguide behaviour with complementary doping indicates sub 100 ps recovery times.

The invention has been thoroughly described thus far. However, it should be noted that the lack of resonator structure, sharp excitonic nonlinearities (when compared to GaAs based MQW's) and outstanding temperature stability resulted in a very stable operation regime up to 76 MHz (limited by the equipment used and not by the modulators of the invention) and down to a few pulses per second.

Figure 8:
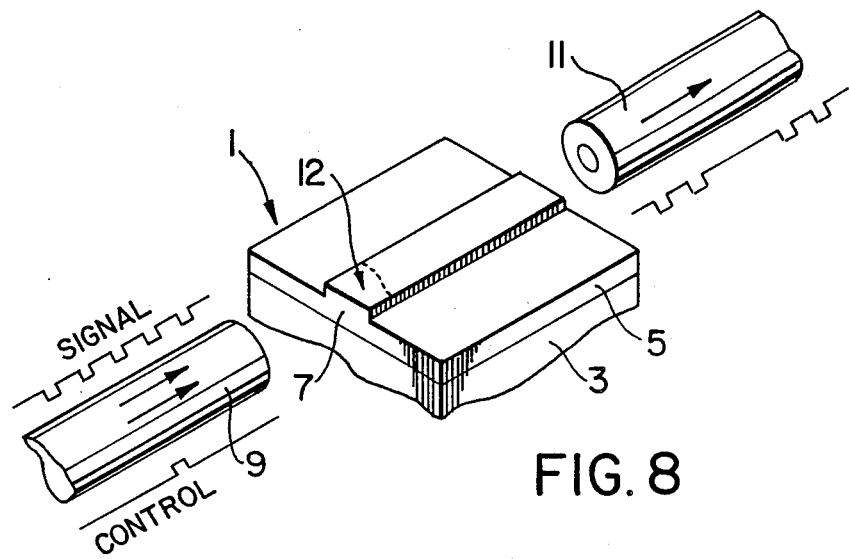
FIG. 8 is a schematic illustration of an all optical modulator according to still another embodiment of the present invention.

The three fiber implementation is close in operation to what could be called an "optical transistor", since only 10–20 mW peak intensity is required to control near 100 mW of guided light. FIG. 8 shows another embodiment which adapts a two-port geometry. In the Figure, like numerals are used for like elements shown in FIG. 1. The control light having a shorter wavelength is carried by the input fiber 9. The interaction region 12 is moved close to the coupling region since the input fiber 9 now multiplex both the signal and control light pulses. The Figure includes pulse forms of which the output pulses indicate modulation by the control pulse by way of the absence of a pulse. This is useful for remote operation by eliminating the need for one fiber and still maintain independence between "control" and "controlled" light signals.

The required switching energy is of the order of a few one-hundred picojoules and this was to further reduced by using a step guide region near cutoff as in the electrooptic modulator geometry.

Figure 9:
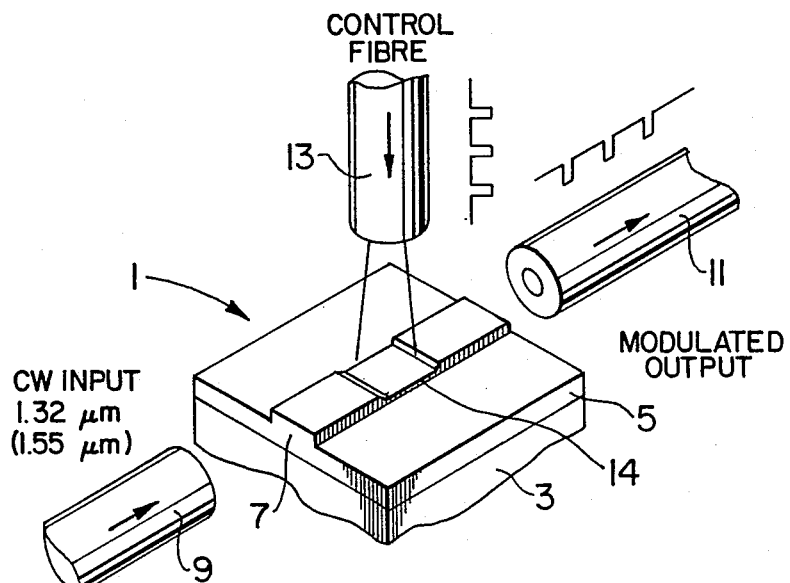
FIG. 9 is a schematic illustration of an all optical modulator according to a further embodiment of the present invention.

FIG. 9 shows such an embodiment to achieve a reduction in driving energy. As in FIG. 8, similar numerals are used in the Figure which also indicates a small region 14 of the channel. The region 14 is already near cutoff in the ridge waveguide because of its thinness.

The potential for high speed operation is also evident. These results are compatible with presently available semiconductor sources. This modulator is basically a three port device and of a geometry suitable for use as a logic gate. As disclosed in the aforementioned co-pending patent application, once the basic modulation functions are achieved, it is possible to obtain all the usual logic gates by using crossed channel guides, except, here, there is gain at each stage and thus fanout is not a problem. Furthermore, many other nonlinear materials are also applicable to these geometries (e.g. GaAs, InSb, liquid crystals, MQW), each with some advantages in certain aspects of operation parameters.

I claim:

1. An optical modulator comprising:
   a channel waveguide having a substrate and a channel provided on the said substrate,
   the said channel having the refractive index higher than that of the said substrate for transmitting therethrough under a guiding condition a light having the wavelength longer than the bandgap energy of the said channel,
   an input fiber optic optically coupled to the said channel for sending the said light thereinto,
   an output fiber optic optically coupled to the said channel for receiving the said light therefrom, and
   a control means optically coupled to the said channel for sending a control light having the wavelength shorter than the said bandgap energy so that the said control light lowers the effective refractive index of the channel to a cutoff level to disturb the said guiding condition.

2. The optical modulator according to claim 1 wherein the said substrate and the said channel are made of an optically nonlinear material but are appropriately doped with dopants to satisfy the said guiding condition of the said channel waveguide.

3. The optical modulator according to claim 2 wherein the said control means comprise a control fiber optic.

4. The optical modulator according to claim 2 wherein the said control means comprises the said input fiber which send both the said light and the said control light into the said channel.

5. The optical modulator according to claim 3 wherein the said optically nonlinear material is silicon and the said substrate and the said channel are doped with a dopant at different levels.

6. The optical modulator according to claim 4, wherein wherein the said optically nonlinear material is silicon and the said substrate and the said channel are doped with a dopant at different levels.

7. The optical modulator according to claim 5 wherein the said dopant is an element selected from a group consisting of n-type dopants of P, As and Sb and p-type of B.

8. The optical modulator according to claim 6 wherein the said dopant is an element selected from a group consisting of n-type dopants of P, As and Sb and p-type of B.

9. The optical modulator according to claim 1 wherein the said channel has the refractive index whose spatial profile is adjusted to suit the intensity profile of the said control light.

10. The optical modulator according to claim 3 wherein the said channel is appropriately doped with a dopant so that the spatial profile of its refractive index suits the intensity profile of the said control light.

11. The optical modulator according to claim 5 wherein the said channel is doped appropriately so that the doping profile matches its spatial profile of the refractive index.

12. The optical modulator according to claim 2 wherein the said optically nonlinear material is a substance selected from a group consisting of liquid crystals, GaAs and InSb.

13. The optical modulator according to claim 3 wherein the said channel has a part smaller in thickness than the remaining part.

14. The optical modulator according to claim 5 wherein the said channel has the refractive index whose spatial profile is adjusted t suit the intensity profile of the said control light.

* * * * *